Figure 1:
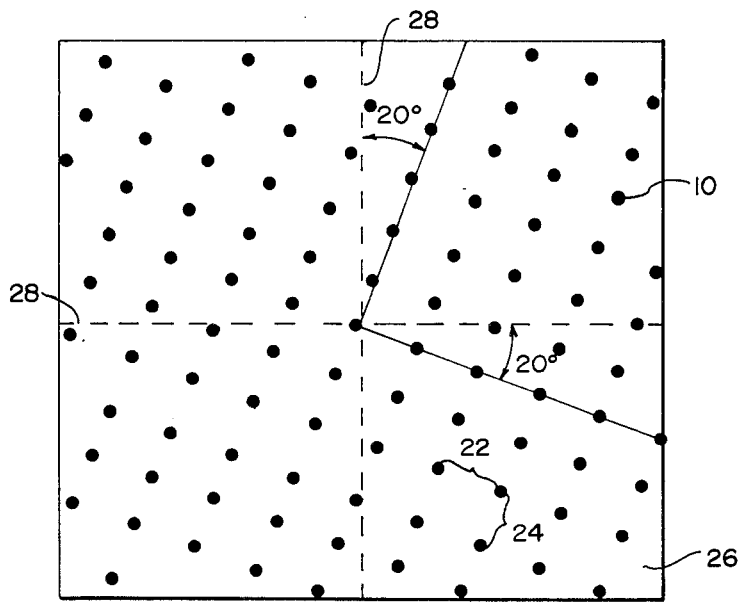

United States Patent [19]

Wendell et al.

[11] Patent Number: 4,613,538

[45] Date of Patent: Sep. 23, 1986

[54] FUSIBLE COATINGS FOR FABRICS

[75] Inventors: David Wendell; Thomas M. Mulgrew, Jr., both of Baltimore, Md.

[73] Assignee: Wendell Textiles, Baltimore, Md.

[21] Appl. No.: 772,939

[22] Filed: Sep. 5, 1985

[51] Int. Cl.$^4$ ............................................. B32B 27/14
[52] U.S. Cl. .................................... 428/198; 428/195; 428/196; 428/200; 428/201
[58] Field of Search ............... 428/195, 198, 200, 201, 428/343, 347, 355, 196

[56] References Cited

U.S. PATENT DOCUMENTS

| | | | |
|---|---|---|---|
| 3,914,493 | 9/1975 | Graber et al. | 428/198 |
| 3,922,418 | 11/1975 | Lauchenauer | 428/198 |
| 3,937,859 | 2/1976 | Carra et al. | 428/198 |
| 4,451,520 | 5/1984 | Tecl et al. | 428/195 |

FOREIGN PATENT DOCUMENTS 0031078 8/1979 Japan.

Primary Examiner—James J. Bell
Attorney, Agent, or Firm—Birch, Stewart, Kolasch & Birch

[57] ABSTRACT

A fusible coating for bonding fabrics to each other comprises a pattern of fusible spots or dots bonded to a fabric substrate. The dots are widely spaced and arranged in a grid-like pattern. The grid-like pattern is skewed at an angle relative to the direction of weave of the fabric substrate.

5 Claims, 3 Drawing Figures

FUSIBLE COATINGS FOR FABRICS

BACKGROUND OF THE INVENTION

The present invention relates to the production of quilted or layered fabric products and, more particularly, to fusible coatings for simulating a stitch pattern of a jump baste or quilted/padded stitching.

Traditional techniques for producing a quilted effect in fabrics when two or more pieces of cloth are joined include use of conventional sewing machines, programmable computer stitching, and dielectric or ultrasonic type bonding of cloth.

Several problems occur in connection with the above-mentioned techniques for producing a quilted effect. For instance, the sewing machine is generally limited to utilizing a single needle for producing the desired stitching pattern. Production capacity is therefore limited by the speed of the sewing machine and the manual dexterity and efficiency of the machine operator. Costs are very high when utilizing this means of production.

Programmable computer stitching is efficient in that full widths of goods may be produced by quilting with multiple needle equipment. A severe limitation, however, is that costly programs are required to produce each pattern. Further, the specialized equipment necessary for this production means is of a high cost and runs at a slow speed.

Dielectric and ultrasonic quilting is also an extremely slow process wherein fibers are melted together as opposed to stitching. A number of drawbacks are immediately apparent with this quilting means, such as extremely slow and costly equipment, a limited number of fabrics which may be utilized in this process, and the fact that the fabric directly adjacent a "fused seam" is weak and subject to rips and tears under minimal stress.

In the art of fusibly bonding fabrics together, it is recognized that spacing of fusible dots is important in maintaining a desirable hand or "feel" to the fabric and prevent a moire or shimmering effect upon application of heat to the fabric. However, the spacing and patterns of the prior art have failed to achieve the desirable effects set forth in the present invention. Prior attempts to fusibly bond fabrics together are typified by the following patents.

U.S. Pat. No. 3,914,493 to Graber et al discloses an iron-in stiffening insert having an adhesive dot pattern arranged thereon. The substrate, however, is a non-woven material, and the dot pattern is of a substantially dense arrangement. The spacing between dots ranges from about 1 to 2.5 times the average diameter of the dots, the actual dot diameter being about 0.86 mm., thereby creating the above-mentioned dense pattern.

U.S. Pat. No. 3,922,418 to Lauchenauer discloses a heat-sealable interlining for textile fabrics wherein a coating of thermoplastic resin particles is applied to the textile sheet, preferably in a regularly spaced pattern of dots. As to the spacing between dots, it is indicated that the areas where dots are not applied should not be so great as to provide inadequate bonding between fused materials, thus suggesting a relatively dense pattern.

U.S. Pat. No. 4,451,520 to Tecl et al relates to a nonwoven fabric having the fibers of the fabric bonded to each other and/or to another material at a plurality of spots. The spot pattern, however, is not intended to provide a quilted pattern, but is intended to solidify a non-woven fabric or act as a stiffening insert for an outer fabric layer.

U.S. Pat. No. 4,333,980 to Russell discloses an interliner for use in garment fabrication. In an example, the number of adhesive dots in a pattern was approximately 28×38 dots per square inch, yielding a total of 1064 per square inch, a very dense pattern.

U.S. Pat. Nos. 3,937,859 to Carra et al, and 4,415,622 to Kamat disclose fusible dot patterns in interlining structures. The material used, however, is of a nonwoven type and no specific size or density of dots are taught.

The above-described products and methods have inherent therein various drawbacks, typically a too-stiff hand in the finished products, as well as exhibiting an undesirable moire effect.

SUMMARY AND OBJECTS OF THE INVENTION

Accordingly, it is a primary object of the present invention to overcome the above-discussed limitations associated with known practices and to provide a fusible coating and technique for combining fabrics to create products having soft, natural hand similar to products of costly machine- or hand-sewn origin.

It is another object of the present invention to provide a fusible fabric coating which may be used to create a quilted or padded product in a uniquely simple and inexpensive manner.

The present invention provides a fabric coating useful for combining fabrics to create layered, quilted or padded products wherein the natural hand (feel) and inherent properties of the outer fabric and the product as a whole are not adversely affected.

The present invention encompasses a coating for fabrics, the coating comprising a particular configuration of dots, spaced in such a manner as to achieve bonding of an interlining to an outer fabric or material without impairing the natural hand and inherent properties of the outer fabric. The dot pattern configuration according to the invention comprises a relatively small number of dots per given area, accommodating any shape or form throughout the pattern.

The present invention provides a coating for holding together, for example, an outer fabric and a lining, in a manner which achieves a desirably soft hand while providing for normal shrinking of the interlining without adversely affecting the appearance of the combined product. The fusible dot coating of the invention does not penetrate the outer fabric as a sewn product or electronic seal will, thus resulting in a more even appearance on the face of the outer fabric. In addition, the present method is much less costly than stitching or ultrasonic welding of two or more pieces of fabric. Also, undesirable thread shrinkage, as may occur from washing and dry cleaning of a sewn product, cannot affect the appearance of a product made according to the invention.

The size of the fusible dots according to the present invention is substantially twenty times larger than that of similar fusible dot products presently being utilized for the same purpose. Further, spacing between dots is approximately ten times greater than the spacing of previously known patterns. Further, the height of the dot is far greater than any present method being utilized. All of these parameters taken in combination with the novel dot pattern of the invention result in a fusible dot coating which will hold firmly together two or molecular weight of about 400 to 6000: a diisocyanate or mixtures of diisocyanates; and the above-mentioned amide as a chain lengthening agent, optionally with further chain lengthening agents, preferably low molecular weight diols and in particular butane diol-1,4.

The amide may be produced in a straightforward manner by reacting 2,2-bis(hydroxymethyl)propionic acid methyl ester and ammonia. The melting point of the substance which was used for the experiments which are described hereinafter is from 174° to 175° C. and is thus higher than described in DE-A No. 2,621,284, thereby indicating a purer preparation.

isophorone diisocyanate, hexamethylene diisocyanate and trimethyl-hexamethylene diisocyanate, optionally as a mixture of the isomers or homologues thereof or as a mixture of various diisocyanates.

Polyesters, polyester amides, polyethers, polyacetals and polycarbonates, which are conventionally used in the production of polyurethanes, are suitable as relatively high molecular weight polyhydroxy compounds. Compounds having two hydroxyl groups per molecule are preferably used, especially those which have an average molecular weight ranging from about 400 to 6000, preferably from about 800 to 3000.

strength of each fused dot is great, whereby few fusible dots are required per square inch of fabric. The specific type of resin used is dependent upon the type of fabrics being bonded together.

Use of a fusible coating according to the invention for a fabric substrate may yield a high loft padding and quilting effect, or a plumper appearance for stiffer materials such as leather or imitation leather. The invention provides a thicker feel but maintains the original hand of the outer fabric whether it is lightweight or a heavier weight fabric. Bonding softer pliable fabric using the inventive coating yields a product with thickness and body, retaining the lofty appearance provided by an interlining without unnecessarily stiffening the outer fabric.

Figure 2:
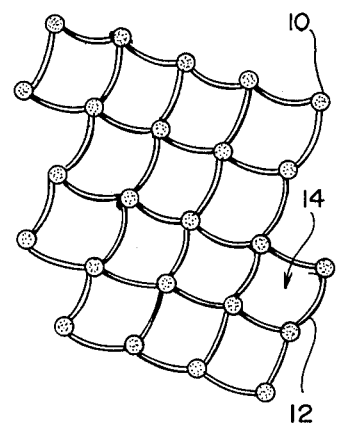
Figure 3:
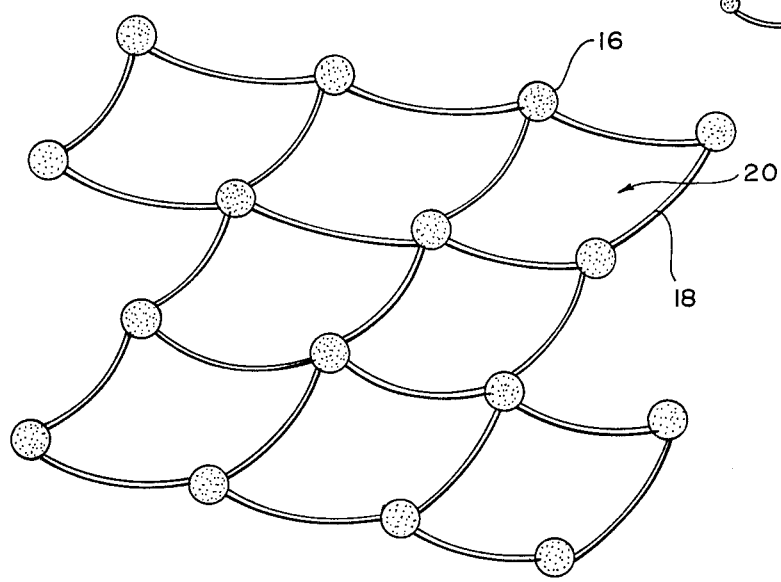

Referring to FIG. 2, there is shown a schematic illustration of how a padded or quilted effect is achieved when materials of lightweight fabric are fused together with the inventive coating. FIG. 3 is a similar schematic view of a padded or quilted effect when materials of extra-heavy fabric are fused together.

Particularly, a pattern comprising a plurality of fusible dots 10 or 16 may be coated on one or both sides of a fabric liner or backing for bonding together the liner or backing and two or more other pieces of fabric. The remaining fabric portions are nonfused. Following substantial shrinking of the interlining or backing layer, a "puffing" or quilted appearance results in the outer fabric or fabrics, which exhibits areas 14 or 20 which appear to be quilted, as shown schematically by lines 12 and 18, respectively.

Comparing FIGS. 2 and 3, it can be seen that dots of the relatively smaller diameter comprising less bonding material are required for lightweight fabrics as opposed to heavier weight fabrics requiring larger dots comprising greater amounts of bonding material as shown in FIG. 2. As a result of the advantageous features of the invention, the spacing can be varied over a broad range to vary the appearance of the final product.

An example of a product advantageously improved by the fusible coating of the invention is a chest piece in tailored clothing. A chest piece is generally made of two or more components forming a single unit which is then placed in the chest area of a garment. Traditionally, the two or more components have been joined by using a jump baste or sewn stitch or by fusing with a substantially continuous or dense fusible coating known as sintering. While the known fused product may be produced relatively cheaply, it has a somewhat stiff and harsh feel and better manufacturers generally utilize the sewn product method because it allows the components to retain their natural hand or feel. As previously mentioned, however, stitching is very expensive and oftentimes stitching will break when the product is laundered due to interlining shrinkage. A fusible coating according to the invention facilitates production of a product having the hand or feel like that of a stitched product while permitting one to take advantage of the economical production methods of the fused product. It is, therefore, possible to economically produce a product which has heretofore not been attainable, except at great cost. Additionally, as discussed above, a product produced with the novel fusible coating of the invention has advantageous features beyond even those produced by the more expensive stitching methods.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed:

1. A fusible coating for a woven fabric substrate to be bonded to another fabric for simulating a stitch pattern of a jump baste or quilted stitching, comprising:

a plurality of fusible dots bonded to said fabric substrate;

said plurality of dots being arranged in a grid-like pattern having columns and rows, the distance between said rows of fusible dots being 6 to 10 millimeters and the distance between said columns of adhesive dots being 8 to 14 millimeters;

wherein said grid-like pattern is skewed at an angle of 12 to 40 degrees from the direction of weave of said substrate.

2. A fusible coating according to claim 1, wherein said plurality of dots are each between 0.5 and 1.5 millimeters in height.

3. A fusible coating according to claim 1, wherein said plurality of dots are each between 3 and 5 millimeters in diameter.

4. A fusible coating according to claim 1, wherein said fusible coating is a fusible resin having a low fusing temperature and low viscosity at the melting point.

5. A fusible coating according to claim 4, wherein said fusible resin is a copolymer adhesive.

* * * * *